Oct. 9, 1945.  U. LAMM ET AL  2,386,322
METHOD AND MEANS FOR OPERATING VAPOR IONIC
VALVES FOR CURRENT CONVERSION
Filed Jan. 6, 1943
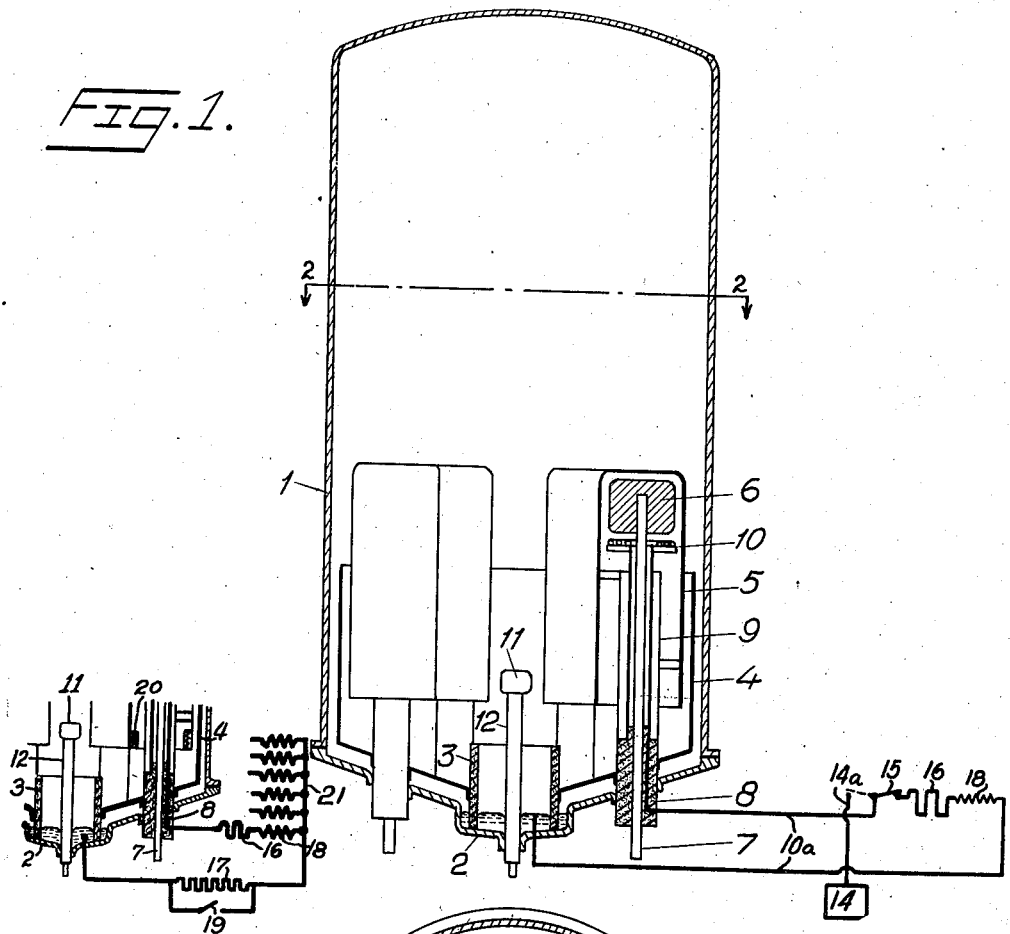
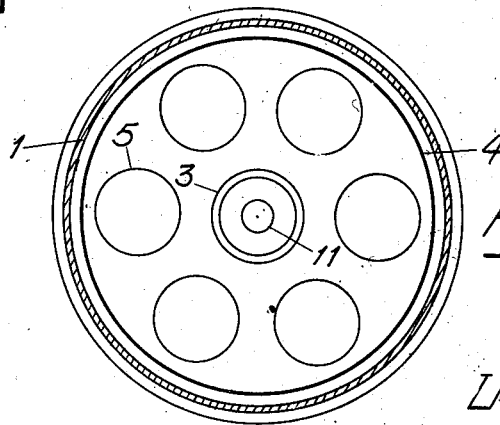
INVENTORS
Uno Lamm
& Jan Plöen
BY
Wm. Wallace White
Attorney Patented Oct. 9, 1945

2,386,322

UNITED STATES PATENT OFFICE 2,386,322

METHOD AND MEANS FOR OPERATING VAPOR IONIC VALVES FOR CURRENT CONVERSION

Uno Lamm and Jan Plöen, Ludvika, Sweden, assignors to Allmänna Svenska Elektriska Aktiebolaget, Vasteras, Sweden, a corporation of Sweden Application January 6, 1943, Serial No. 471,446
In Sweden January 9, 1942

5 Claims. (Cl. 315—112)

It is known that vapor ionic valves for current conversion, in which the conducting vapor generally consists of mercury vapor, do not operate well at low temperatures, because of which difficulty, failure of ignition may occur so as to cause interruption of conduction and voltage surges as consequences. There is reason to believe that this fact depends on the low density of the mercury vapor at such temperatures, which may cause scarcity of molecules capable of being ionized. It is therefore customary, in water-cooled ionic valve vessels, to heat the cooling water during periods of no or low charge so as to keep the current converter prepared to receive full charge at any instant without disturbances. For this purpose, however, comparatively large quantities of heat are necessary, and such a heating is still more difficult to achieve in air-cooled current converters, especially in those with natural air draught, arranged for instance in open air or in non-heated localities.

The purpose of the present invention is to enable vapor ionic valves for current conversion to be operated at a low surrounding temperature with a very small demand of heating power. The invention consists primarily in providing a structure and such a mode of operation that, in a valve vessel having internal anode sleeves and a screen inside the vessel wall surrounding the lower ends of said sleeves and the cathode space, the interior of the anode sleeves is heated by a source of heat acting therein during a certain time while the converter is still inactive before it is being loaded, and in simultaneously maintaining an arc spot on the cathode. The necessary power consumed by the said source of heat in order to keep the valve vessel in an operative condition has been found to amount to only a small fraction of what would be necessary for obtaining the same result by external heating. This result depends essentially on the heat insulating action of the aforesaid screen and to a certain extent also of the anode sleeves, which act together with the screen to screen the space between the cathode and the mouths of the anode sleeves against the cold external wall and thereby to keep the temperature of the surfaces, which are in contact with the arc at a subsequent loading, essentially higher as would otherwise correspond to the external temperature.

If the anodes are provided with grids for controlling the direct current voltage or possibly only for stabilizing the operation, it may be advisable also to cause a current to flow between these grids and the cathode during the periods when a heating is considered desirable. A suitable order of magnitude of this current has proved to be about one ampere for each grid. For this purpose, there may either be impressed a direct current voltage between the grids and the cathode so as to make all the grids carry current at the same time, or there may be impressed an alternating current voltage so that the grids will succeed each other in carrying current. In the latter case, the value of one ampere represents the mean value. By the grid currents, also the anodes and the other parts adjacent to the anodes are kept at a temperature higher than that corresponding to the vapor pressure between the sleeves and the cathode during the preheating period, whereby to prevent the occurrence of a state of low density of the mercury vapor in the arc path at the beginning of the operative period even though the temperature of the parts adjacent to the said path be still reduced. As the voltage necessary for producing these currents is, as a rule, lower than that which should be impressed on the grids in normal operation, a change-over switch may be provided which, in connection with the loading of the converter, changes the connection of the grids to a voltage source suitable herefor.

A construction of a valve vessel suitable for carrying the invention into effect is illustrated in the accompanying drawing, in which:

Fig. 1 is a vertical section of a vapor ionic valve showing the preferred form of the invention, Fig. 2 is a horizontal section along the line 2—2 of Fig. 1; and Fig. 3 is an enlarged fragmentary section illustrating another form of this invention.

Reference numeral 1 denotes the valve vessel proper which has at its bottom a cathode receptacle 2. The active cathode surface is, in a manner known per se, limited by an insulating cylindrical screen 3 to which a funnel-shaped plate screen 4 is fitted. The plate screen 4 extends somewhat above the lower open ends of the anode sleeves 5. The leading-in conductors 7 of the anodes 6, in the preferred form shown, enter the bottom and are surrounded by insulators 8 and screening sleeves 9. The anodes have grids 10 for controlling or stabilizing purposes.

According to a preferred form of the present invention, a current is drawn, during a certain period before the starting of the converter, from the anode grids to the cathode. This current should, however, preferably be limited to the order of magnitude of one ampere per grid (mean value), in order to prevent an overloading of the grids. In the case of the most usual arrangement of six anodes in the vessel, the total grid current would thus be 6 amperes, which is generally sufficient for the heating in view of the fact that the interiors of the anode sleeves are screened against the outer wall.

The space between the anode sleeves 5 generally contains one or more exciting anodes 11 which may be kept active during all periods of low load and also during periods of no load before a coming load period. Thus for instance before starting after a long period of no load, the exciting anodes may be ignited before the main anodes. In view of the fact that the space between the anode sleeves and the cathode is screened against the outer wall by the anode sleeves 5 and also by the screen 4, the temperature therein may be kept essentially higher than that of the outer wall by a moderate power of the exciting arc, for instance 5 amps. by 25 volts.

The high ohmic resistances generally connected in series with the grids in normal operation should of course not be traversed by the heating current drawn from the grids. Without these resistances, the voltage source for feeding the grid current will be of the same order of magnitude as the voltage source for the exciting current. This voltage source may be the same for both the grid current and for the exciting current, for instance a common source of direct current. When the main current is switched on, the connection between the common source of current and the grids is broken and the latter are connected with their ordinary source of current through the grid resistances. Such an arrangement is illustrated in Fig. 1, wherein a circuit 10a ordinarily connects grid 10 and cathode 2 with a grid resistance 16, the grid transformer 18, and switch 15 in the circuit. A second source of voltage 14 is connected to the contact 14a of switch 15 so that before the main source of current derived through grid transformer at 18, the armature of switch 15 may be moved to its dotted line position, thereby disconnecting the main source of current and connecting source 14. However, when the armature of switch 15 is moved to its full line position, its second source 14 is cut out and the main source connected. In the drawing, the connection to but one grid is shown, it being obvious that similar connections for the other grids may be provided. The said connection may, however, also exist during the preheating period, when it is practically ineffective on account of the high grid resistances. When using the so-called "floating" grid connection (U. S. Patent No. 2,063,106), it would also be possible to reduce the ohmic value of the ordinary grid resistances so much (for instance to the order of magnitude of 20 ohms or less) as to make it possible to retain these resistances in circuit also during the preheating period. The heating may then be effected by means of the ordinary grid transformer, the current being limited, if necessary, by a reactor in series with the primary winding of the said transformer. The changing-over of the grid circuit in loading the converter may then simply be effected by connecting a resistance between the grid neutral and the cathode. An arrangement of this type is illustrated in Fig. 3, wherein like reference numerals are applied to elements similar to those described in reference to Figs. 1 and 2, but wherein instead of using the second source of voltage as at 14 in Fig. 1, a high ohmic resistance 17 is connected between the grid transformer neutral 21 and cathode 2, with a switch 19 provided for short circuiting resistance 17. In this form the grid neutral 21 is separated from the cathode by the resistance 17. The figure shows six secondary windings 18 of the grid transformer corresponding to a six anode vessel. All these secondary windings 18 are connected together at one end to form a neutral 21, while the other ends are connected to the grids, although only one of the connections is shown on the drawing.

In some cases a grid current may be sufficient for heating the space between the cathode and the anode sleeves, so that a separate exciting arc is not necessary for this purpose. For heating the interior of the anode sleeves, separate heating elements 20 may also be placed inside or immediately outside the said sleeves, although the described methods for heating by means of arcs are generally preferred as more convenient. If separate heating elements are used instead of a grid current, one or more exciting anodes external to the anode sleeves should always be active in order to maintain an arc.

Experiments have proved that the aforesaid method of keeping the internal parts touched by the arc at a high temperature is sufficient for keeping the vapor density in the arc paths sufficiently high for the passage of a stable current when the converter is loaded. The large quantity of vapor developed at the cathode causes a pressure drop between the arc space and the cold condensation surfaces at the wall of the vessel (for instance above the anode sleeves) which is sufficiently high for this purpose.

We claim as our invention:

1. The method of operating a vapor ionic valve serving current converting purposes of the type including a valve vessel, anode sleeves, a cathode, and a screen inside said vessel surrounding part of said anode sleeves and the spaces between them and the cathode, which comprises heating the interior of said anode sleeves by a heating source active therein during a certain period of no load of the converter before the load is turned on and maintaining at the same time an arc spot on the cathode.

2. The method of operating a vapor ionic valve serving current converting purposes of the type including a valve vessel, anode sleeves, anode grids, a cathode, and a screen inside said vessel surrounding part of said anode sleeves and the space between them and the cathode, which comprises maintaining a current of the approximate order of magnitude of one ampere between each anode grid and the cathode.

3. In vapor ionic valves for current converting purposes, a valve vessel, a cathode, anodes, anode grids, and anode sleeves in said vessel, a screen therein surrounding part of said anode sleeves, two sources of different voltage for impressing a current between said anode grids and said cathode, and a change-over switch for connecting the grids alternatively to each of said voltage sources.

4. In vapor ionic valves for current converting purposes, a valve vessel, a cathode, anodes, anode grids, and anode sleeves in said vessel, a screen therein surrounding part of said anode sleeves, a source of alternating current voltage for impressing a voltage between said grids and a neutral separated from the cathode, and low-ohmic resistances between said source of voltage and the grids.

5. In vapor ionic valves for current converting purposes, a valve vessel, a cathode, anodes, anode grids, and anode sleeves in said vessel, insulated leading-in conductors to said anodes penetrating the bottom of said vessel, a screen in said vessel surrounding part of said anode sleeves, and means within said anode sleeves for locally heating the interior thereof independently of an operative current through said anodes and relatively independently of the temperature of the remainder of the interior of the vessel.

UNO LAMM.
JAN PLÖEN.